United States Patent

[11] 3,613,791

[72] Inventor Walter B. Kirk
 Robinson, Ill.
[21] Appl. No. 21,201
[22] Filed Mar. 19, 1970
[45] Patented Oct. 19, 1971
[73] Assignee Marathon Oil Company
 Findlay, Ohio

[54] PROCESS FOR STIMULATION OF GAS-PRODUCING WELLS
 11 Claims, No Drawings

[52] U.S. Cl. ..................................................... 166/305 R
[51] Int. Cl. ..................................................... E21b 43/25
[50] Field of Search .......................................... 166/305 R,
 273, 274; 252/8.55 B, 8.55 R

[56] References Cited
UNITED STATES PATENTS

| | | | |
|---|---|---|---|
| 3,386,506 | 6/1968 | Quance ....................... | 166/273 |
| 3,460,622 | 8/1969 | Davis, Jr. .................... | 166/273 X |
| 3,465,822 | 9/1969 | Klein .......................... | 166/273 X |
| 3,472,320 | 10/1969 | Dyes ........................... | 166/273 |
| 3,506,070 | 4/1970 | Jones .......................... | 166/274 |
| 3,537,523 | 11/1970 | Gogarty et al. ............... | 166/305 |
| 3,554,288 | 1/1971 | Ross ........................... | 166/305 |

*Primary Examiner*—Stephen J. Novosad
*Attorneys*—Joseph C. Herring, Richard C. Willson, Jr. and Jack L. Hummel ABSTRACT: Stimulation of gas-producing wells is effected by 1) injecting about 1–500 gallons of micellar dispersion per vertical foot of hydrocarbon-bearing formation into the formation, 2) injecting about 0.1–10 volumes of water per volume of micellar dispersion, 3) injecting sufficient gas to displace substantially all of the water out into the formation to a radius of at least about 7.5 feet, and 4) permitting the well to produce. The micellar dispersion is comprised of hydrocarbon, surfactant and aqueous medium.

PROCESS FOR STIMULATION OF GAS-PRODUCING WELLS

CROSS-REFERENCE TO RELATED APPLICATIONS

U.S. application Ser. No. 762,129 to Ross, filed Sept. 24, 1968, now U.S. Pat. No. 3,554,288 teaches the removal of water blocks from gas-producing wells by using micellar dispersions.

BACKGROUND OF THE INVENTION

1. Field of the Invention

This invention relates to the stimulation of gas-producing wells by injecting a miscible-type agent, i.e., a micellar dispersion, having the capability of solubilizing both hydrocarbon and water. The micellar dispersion is followed by water, and then by a gas.

2. Description of the Prior Art

U.S. Pat. No. 2,369,831 to Jones teaches increasing the effective permeability of an oil or gas well by introducing a soluble oil into the well, forcing the soluble oil approximately 4–5 feet into the surrounding formation, then withdrawing the soluble oil. The withdrawn soluble oil contains solubilized foreign matter. Particular soluble oils mentioned are "anhydrous" soluble oils.

U.S. Pat. No. 2,356,205 to Blair, Jr. et al. teaches the use of micellar solutions to remove wax, associated occlusions, and brine from the immediate well bore vicinity of a producing well. This is done by injecting a micellar solution into the well bore, permitting the micellar solution to solubilize, disperse or disrupt the waxy or allied occlusions, and then permitting the production well to produce to remove the solubilized material uphole.

U.S. Pat. No. 3,470,958 to Kinney teaches stimulating producing wells by injecting an oil-external micellar dispersion into the oil-bearing formation. Thereafter, sufficient hydrocarbon is injected to displace the micellar dispersion out into the reservoir.

SUMMARY OF THE INVENTION

Applicant has discovered a novel method of increasing the injectivity index of a gas-producing well. This is done by injecting about 1–500 gallons of micellar dispersion per vertical foot of hydrocarbon-bearing formation into the formation, thereafter injecting about 0.1–50 volumes of water per volume of micellar dispersion and then displacing the micellar dispersion and water out into the formation to a radius of at least 7.5 feet with a gas. Preferably, the gas is hydrocarbon and is characteristic of the gas-producing well. The gas is injected to displace the micellar dispersion (containing the solubilized foreign matter) and the water out into the formation and to reestablish the gas phase.

DESCRIPTION OF PREFERRED EMBODIMENTS OF INVENTION

The collection of foreign matter, including skin damage, in the well bore of a gas-producing well adversely influences the flow and production of natural gas. Part of this foreign matter is the accumulation of heavy hydrocarbons and "debris" carried by the hydrocarbons to the immediate vicinity of the well bore. The result causes an adverse skin effect. That is, the productivity index of the gas-producing well is reduced.

The micellar dispersion is comprised of hydrocarbon, aqueous medium, and surfactant. Optionally, cosurfactant and/or electrolytes can be incorporated into the dispersion. Also, other desired additives such as bactericides, oxygen scavenging agents, corrosion and oxidation inhibitors, etc., may be incorporated within the micellar dispersion. Examples of useful micellar dispersions can be found in U.S. Pat. No. 3,254,714 to Gogarty et al., U.S. Pat. No. 3,497,006 to Jones et al., U.S. Ser. No. 693,099, filed Dec. 26, 1967 by Jones, and now U.S. Pat. No. 3,506,070; U.S. Pat. Ser. No. 693,125, filed Dec. 26, 1967 by Jones, and now U.S Pat. No. 3,506,071. The micellar dispersion can be oil-external or water-external but is preferably oil-external.

The hydrocarbon useful in the micellar dispersion can be crude oil, partially refined fractions of crude oil, or refined fractions of crude oil. Synthesized hydrocarbons are also useful as the hydrocarbon as well as the unreacted hydrocarbon within petroleum sulfonates.

The surfactant can be cationic, anionic, or nonionic. Examples include those found in U.S. Pat. No. 3,474,865 to Gogarty et al. Preferably, the surfactant is a petroleum sulfonate having an average equivalent weight within the range of about 350 to about 525. Low, medium and high-equivalent weight sulfonates and mixtures of two or more surfactants are useful. Sodium sulfonates and ammonium sulfonates are especially useful with this invention.

The aqueous medium can be soft water, brackish water, or a briny water. When the aqueous medium contains ions, the ions are preferably compatible with the ions within the subterranean formation being treated.

The cosurfactant (also known as semipolar organic compound and cosolubilizer) can be an alcohol, ester, ether, aldehyde ketone, amine, amino compound, and like compounds containing from about one to about 20 or more carbon atoms. Examples include those taught in U.S. Pat. No. 3,474,865. Combinations of two or more of the above groups on a molecule are also useful, e.g., the combination of ether and a hydroxy grouping such as 2-butoxyethanol Electrolytes useful include those found in U.S. Pat. No. 3,297,084 to Gogarty et al. and U.S. Pat. No. 3,330,343 to Tosch et al. The electrolyte can be an inorganic base, inorganic acid, inorganic salt, organic base, organic acid, or organic salt which is strongly or weakly ionized. Preferably the electrolyte is inorganic base, inorganic salt, or inorganic acid and is preferably compatible with the ions within the subterranean formation.

Examples of volume amounts within the micellar dispersion include from about 10 percent or less to about 95 percent aqueous medium, about 1 percent to about 80 percent or more hydrocarbon, at least about 4 percent surfactant, about 0.01 percent to about 20 percent or more and preferably 0.1–5 percent of the cosurfactant and from about 0.001 percent to about 5 percent or more of the electrolyte.

From about 1 to about 500, preferably about 5 to about 250 and more preferably about 25 to about 200 gallons of the micellar dispersion per vertical foot of hydrocarbon-bearing formation is useful with this invention.

The micellar dispersion is followed by about 0.1 to about 10 or more volumes of water per volume of the micellar dispersion. The water can be soft, brine, or brackish water. Where the water contains ions, it is preferred that the ions are compatible with the water within the subterranean formation and also with the reservoir rock. The water, among other things, acts as a mobility buffer.

After the water is injected into the formation, there is injected sufficient gas to displace substantially all of the water out to a radius of at least about 7.5 feet and preferably 15 feet from the well bore. The gas can be an inorganic gas, an organic gas or combination of the two. For example, it can be $CO_2$, $N_2$, combustion products from natural gas, lower molecular weight hydrocarbons, (e.g. methane, ethane, propane, and mixtures thereof), or any gas that is compatible with the subterranean formation.

It is postulated that the micellar dispersion solubilizes the foreign matter which causes the adverse skin effect. After solubilization of the adverse foreign matter, the micellar dispersion is displaced out into the reservoir by the injection of water. Thereafter, the gas displaces the water away from the well bore to reestablish the gas phase in the reservoir in the immediate vicinity of the well bore. Thereafter, the well is permitted to produce and increased productivity index is realized.

It is intended that all equivalents obvious to those skilled in the art be equated within the invention as defined within the specification and appended claims.

What is claimed is:

1. A process of stimulating a well-producing gas comprising:
   1. injecting about 1 to about 500 gallons of a micellar dispersion per vertical foot of hydrocarbon-bearing formation into the formation,
   2. injecting about 0.1 to about 50 volumes of water per volume of micellar dispersion into the formation,
   3. injecting sufficient gas to displace substantially all of the water to a radius of at least about 7.5 feet away from the well bore, and
   4. permitting the well to produce.
2. The process of claim 1 wherein the micellar dispersion is oil-external.
3. The process of claim 1 wherein the micellar dispersion is water-external.
4. The process of claim 1 wherein the micellar dispersion is comprised of hydrocarbon, aqueous medium and petroleum sulfonate.
5. The process of claim 4 wherein the micellar dispersion contains cosurfactant and/or electrolyte.
6. The process of claim 1 wherein from about 5 to about 250 gallons of the micellar dispersion per vertical foot of hydrocarbon-bearing formation is injected into the formation.
7. The process of claim 1 wherein sufficient gas is injected to displace substantially all of the water to a radius of at least about 15 feet away from the well bore.
8. The process of claim 1 wherein the water injected into the formation is compatible with the ions within the subterranean formation.
9. The process of claim 1 wherein the micellar dispersion is comprised of about 1-80 percent hydrocarbon, about 10-95 percent aqueous medium, and at least about 4 percent surfactant.
10. The process of claim 9 wherein the micellar dispersion optionally contains about 0.01 to about 20 percent cosurfactant and/or about 0.001 to about 5 percent by weight of electrolyte.
11. The process of claim 1 wherein the gas is an organic gas.